US009857590B2

(12) United States Patent
Hall, Jr.

(10) Patent No.: US 9,857,590 B2
(45) Date of Patent: Jan. 2, 2018

(54) METHOD AND SYSTEM FOR PRESS-ON DISPLAYS FOR FASHIONABLE EYEWEAR AND NOSEWEAR

(71) Applicant: Floyd Steven Hall, Jr., Sacramento, CA (US)

(72) Inventor: Floyd Steven Hall, Jr., Sacramento, CA (US)

( * ) Notice: Subject to any disclaimer, the term of this patent is extended or adjusted under 35 U.S.C. 154(b) by 228 days.

(21) Appl. No.: 14/512,419

(22) Filed: Oct. 11, 2014

(65) Prior Publication Data

US 2016/0103322 A1    Apr. 14, 2016

(51) Int. Cl.
  *G02B 27/01*  (2006.01)
(52) U.S. Cl.
  CPC ..... *G02B 27/0172* (2013.01); *G02B 27/0176* (2013.01); *G02B 2027/0132* (2013.01); *G02B 2027/0178* (2013.01)
(58) Field of Classification Search
  CPC ............ G02B 27/0172; G02B 27/0176; G02B 27/0178; G02B 27/0132; G02C 11/10; G02C 11/02; G06F 3/015; G06F 3/011
  USPC ............................................................. 345/8
  See application file for complete search history.

(56) References Cited

U.S. PATENT DOCUMENTS

| | | | | |
|---|---|---|---|---|
| 4,867,551 A * | 9/1989 | Perera | ................. | G02B 27/0176 351/158 |
| 4,955,713 A * | 9/1990 | Naderi | .................... | A61H 5/00 351/200 |
| 5,162,828 A * | 11/1992 | Furness | ................... | G01S 13/60 351/158 |
| 5,594,573 A * | 1/1997 | August | ................ | G02B 27/017 349/13 |
| 5,719,588 A * | 2/1998 | Johnson | ............ | G02B 27/0172 345/8 |
| 6,091,546 A * | 7/2000 | Spitzer | ................. | G02B 27/017 345/8 |
| 6,349,001 B1 * | 2/2002 | Spitzer | ................. | G02B 27/017 345/8 |
| 6,947,014 B2 * | 9/2005 | Wooten | .................. | G02C 11/10 345/7 |
| 7,319,437 B2 * | 1/2008 | Yamamoto | ........... | G02B 27/017 345/7 |
| 7,500,747 B2 * | 3/2009 | Howell | .................. | G02C 11/10 351/158 |
| 7,663,805 B2 * | 2/2010 | Zaloum | ................ | G02B 27/017 351/123 |
| 7,922,321 B2 * | 4/2011 | Howell | .................. | G02C 5/001 351/122 |
| 7,982,689 B2 * | 7/2011 | Yamamoto | ........... | G02B 27/017 345/7 |
| 8,500,271 B2 * | 8/2013 | Howell | .................. | G02C 5/001 351/122 |
| 8,531,355 B2 * | 9/2013 | Maltz | ...................... | H04W 4/20 345/8 |
| 8,614,676 B2 * | 12/2013 | Chiang | ................. | G06F 1/1626 345/156 |
| 8,670,000 B2 * | 3/2014 | Braun | .................... | G09G 3/002 345/617 |
| 8,905,542 B2 * | 12/2014 | Howell | .................. | G02C 5/001 351/158 |
| 8,941,953 B2 * | 1/2015 | Nishida | .................... | G11B 5/48 360/244.7 |

(Continued)

*Primary Examiner* — Joshua T Kennedy (57) ABSTRACT

A method and system to provide an alternative to head-mounted displays, which is socially acceptable across mainstream consumers, is disclosed.

20 Claims, 7 Drawing Sheets

(56) References Cited

U.S. PATENT DOCUMENTS

| | | | |
|---|---|---|---|
| 8,971,023 B2* | 3/2015 | Olsson | G02C 5/12 345/8 |
| 9,128,284 B2* | 9/2015 | Cazalet | G02B 27/0172 |
| 9,151,953 B2* | 10/2015 | Qaddoura | G02B 27/0172 |
| 9,153,074 B2* | 10/2015 | Zhou | G06F 1/163 |
| 9,459,455 B2* | 10/2016 | Cakmakci | G02B 27/0172 |
| 9,468,541 B2* | 10/2016 | Contreras-Vidal | A61B 5/04842 |
| 9,488,833 B2* | 11/2016 | Cervantes | G02B 27/0101 |
| 9,579,060 B1* | 2/2017 | Lisy | A61B 5/6803 |
| 2004/0119663 A1* | 6/2004 | Wooten | G02C 11/10 345/8 |
| 2006/0203084 A1* | 9/2006 | Okazaki | G02B 27/0176 348/46 |
| 2008/0186586 A1* | 8/2008 | Yamamoto | G02B 27/0176 359/630 |
| 2009/0091838 A1* | 4/2009 | Zaloum | G02B 27/017 359/630 |
| 2010/0079356 A1* | 4/2010 | Hoellwarth | G02B 27/017 345/8 |
| 2010/0103078 A1* | 4/2010 | Mukawa | G02B 27/0172 345/8 |
| 2011/0221656 A1* | 9/2011 | Haddick | G02B 27/017 345/8 |
| 2012/0212398 A1* | 8/2012 | Border | G02B 27/017 345/8 |
| 2012/0293548 A1* | 11/2012 | Perez | G06F 3/012 345/633 |
| 2013/0033756 A1* | 2/2013 | Spitzer | G02B 27/01 359/630 |
| 2013/0214999 A1* | 8/2013 | Hiraki | G02B 27/017 345/8 |
| 2013/0222668 A1* | 8/2013 | Anderson | H04N 5/23293 348/333.08 |
| 2013/0274583 A1* | 10/2013 | Heck | A61B 5/0488 600/383 |
| 2014/0118829 A1* | 5/2014 | Ma | G02B 5/1885 359/567 |
| 2015/0042877 A1* | 2/2015 | O'Neill | H04N 5/2254 348/376 |
| 2016/0130018 A1* | 5/2016 | Subramanyam | B64F 5/0081 701/33.2 |
| 2016/0239084 A1* | 8/2016 | Connor | A61B 5/0478 |
| 2016/0345901 A1* | 12/2016 | Connor | A61B 5/0478 |
| 2017/0199569 A1* | 7/2017 | Cruz-Hernandez | G06F 3/016 |

* cited by examiner

METHOD AND SYSTEM FOR PRESS-ON DISPLAYS FOR FASHIONABLE EYEWEAR AND NOSEWEAR

FIELD OF INVENTION

The present invention relates to Head-Mounted Displays (HMDs).

DESCRIPTION OF PRIOR ART

Head-Mounted Displays (HMDs) have been around for many years, yet said head-mounted displays have not become ubiquitous across mainstream consumers, because said head-mounted displays have not been socially acceptable to said mainstream consumers. The objections expressed by said mainstream consumers, regarding said head-mounted displays, include said head-mounted displays are too nerdy and too obtrusive. See "Head Mounted Display Market 2012-2017: Global Forecasted and Analyzed by Products, Components, Application, and Geography"; Havig, P., Goff, C., McIntire, J., Franck, D., *HMDs: Why haven't they taken off?*, Air Force Research Lab 711 HPW/RHCV 2255 H St., Write-Patterson AFB, Ohio 45433; Negrete, C., *The HMD Blues*, web article (2008), accessed 12 Feb. 2009 from http://thenegret.wordpress.com/2008/02/07/the-hmd-blues/. Several examples of said head-mounted displays are Golden-i from Kopin, Glass from Google, Crystal from MyVu, and a family of HMD products from Vuzix.

HMD frame design, and the distribution of HMD electronics within said HMD frame, usually are tightly integrated, and said HMD electronics typically is hidden inside said HMD frame. Said HMD electronics can include a processor, memory, storage, wireless radios (WiFi, Bluetooth, optional mobile phone radio circuitry, Software Defined Radio, etc), antenna, GPS, digital compass, biometrics sensors (optical nerve recognition sensor, etc.), operating system, voice/speech interface, microdisplay, projector, battery, head-tracking/eye-tracking/blink-detection chip, speakers, microphone, and cameras. Just like PCs, said HMDs are electronics devices regulated by government agencies, such as the FCC in the United States. As a result, said HMD frames historically have been designed to help ensure compliance with those government regulations. More specifically, the design of said HMD frames typically have taken into consideration functional design factors which can include the reduction of interference radiation caused by said HMD electronics contained within said HMD frames, the dissipation of heat generated by said HMD electronics contained within said HMD frames, the distribution of weight of said HMD electronics contained within said HMD frames, and the concealment of said HMD electronics contained within said HMD frames. Thus, the compelling need to comply with government regulations has resulted in HMD frame designs that have been predominately functional, rather than fashionable. However, said mainstream consumers want frame designs that are fashionable, rather than functional. As a result, said HMDs have not become ubiquitous across said mainstream consumers. Accordingly, a solution that is socially acceptable across said mainstream consumers is needed.

SUMMARY OF THE INVENTION

The present disclosures are based on the insight that said HMD electronics can be replaced with miniature transparent smartphones, and the resulting HMD frame, with said HMD electronics removed, can be replaced with fashionable eyewear and nosewear. Thus, the combinations of said miniature transparent smartphones, and said fashionable eyewear and nosewear, will result in a solution that is socially acceptable across said mainstream consumers. More generally, the combinations of a display means, and said fashionable eyewear and nosewear, will result in a solution that is socially acceptable across said mainstream consumers, where said display means can refer to either said miniature smartphone, or a miniature eReader, or a miniature television, or a miniature movie player, or a miniature game console, or a miniature computer, or a miniature video receiver.

The present disclosure covers a transparent display means, where said transparent display means can be sandwiched in between an electrochromic lens in front and an electrochromic screen in back. Said transparent display means is transparent when powered OFF. Said electrochromic lens is transparent when said transparent display means is powered OFF, and is a focusing lens, or magnifying lens, or both a focusing and magnifying lens, while said transparent display means is powered ON. Said electrochromic screen is transparent when said transparent display means is powered OFF, and is either partially opaque, or fully opaque, while said transparent display means is powered ON. Said partially opaque said electrochromic screen enables said transparent display means to be used for augmented reality applications. Said fully opaque said electrochromic screen enables said transparent display means to be used for movies, entertainment, and productivity applications like Microsoft Office. Said fully opaque said electrochromic screen is analogous to the silver screens in movie theatres, upon which movies are shown.

Said display means, along with an optional optics means, both can be inserted inside a press-on display means holder, where said optics means, which is located in front of said display means, can function as a focusing lens or magnifying lens or both a focusing and magnifying lens, and enables a virtual big screen viewing experience. In one embodiment, said optical means is said electrochromic lens. Said press-on display means holder can be made of transparent materials, and thus can be transparent all the time. When said display means, and perhaps also said optional optics means, have been inserted into said press-on display means holder, the combination is referred to as a press-on display, where said press-on display can be attached to the lenses for fashionable eyewear and nosewear, or attached to said nosewear directly with no lens involved. Said lenses for fashionable eyewear and nosewear can be dual-use lenses, where the surface of said lenses for fashionable eyewear and nosewear are covered with flexible transparent batteries, where said flexible transparent batteries can be charged wirelessly, and provide power to devices such as said display means.

One embodiment of said nosewear disclosed is a pince-nez mounting means that clips onto the bridge of the nose, and positions said press-on display near-to-eye. Said pince-nez mounting means can be augmented with a neural communicator means, where said neural communicator means enables the wearer to control said display means using the wearer's thoughts. Moreover, said neural communicator means can enable the wireless digital sharing of human senses between humans, where said human senses include: thoughts, smell, taste, touch, sight, and hearing.

Finally, the present disclosure discloses a method for a new use for pince-nez mountings, comprising: using pince-nez mountings for attaching one or more said display means to said nose.

DETAILED DESCRIPTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the invention. Thus, the present invention is not intended to be limited to the embodiments disclosed, but is to be accorded the widest scope consistent with the principles and features disclosed herein.

The present invention is based on a novel and unobvious insight:

HMDs can be replaced with miniature smartphones pressed onto the lenses of fashionable eyewear, for said mainstream consumers who prefer to wear eyewear. In one embodiment, said miniature smartphones are transparent when turned OFF. In one embodiment, said fashionable eyewear includes a neural communicator means that communicates with said miniature smartphones.

HMDs can be replaced with miniature smartphones pressed onto fashionable nosewear, for said mainstream consumers who prefer not to wear eyewear. In one embodiment, said miniature smartphones are transparent when turned OFF. In one embodiment, said fashionable nosewear uses pince-nez mountings that can include a neural communicator means. In one embodiment, said neural communicator means communicates with said miniature smartphones, and in one embodiment, said nosewear is transparent.

More specifically, said HMD electronics can be replaced with miniature smartphones, and the resulting HMD frame, without said HMD electronics, can be replaced with fashionable eyewear and nosewear.

In the detailed embodiments disclosed, miniature refers to a size range about the size of the human eye, or smaller. In the detailed embodiments disclosed, a miniature smartphone uses a miniature display from a plurality of possible miniature displays. Examples of said plurality of possible miniature displays are the family of microdisplays from Kopin, Sony, Epson, and Himax. Other examples of said plurality of possible miniature displays are miniature projectors, such as the picoP projector from Microvision. In one embodiment, said miniature displays can be integrated with an optics means. In one embodiment, said optics means can be a focusing means, where in one embodiment said focusing means includes a lens. In another embodiment, said optics means is a single Fresnel lens used as a focusing means. In still another embodiment, said optics means is a plurality of Fresnel lenses used as a focusing means. In yet another embodiment, said optics means is a digitally controlled focusing means. In another embodiment, said optics means is a magnifying means that creates a virtual big screen viewing experience. In another embodiment, said optics means is a digitally controlled magnifying means. In yet another embodiment, said optics means combines said focusing means and said magnifying means. In another embodiment, said optics means is an electrochromic lens. In one embodiment, said electrochromic lens is a transparent when powered OFF, and a focusing lens, or magnifying lens, or both a focusing and magnifying lens, while powered ON. One example of a transparent electrochromic lens is a plano lens. In one embodiment, said electrochromic lens includes a wireless power receiver. In one embodiment, said wireless power receiver is a loop antenna. In another embodiment, said wireless power receiver is a coil. In the detailed embodiments disclosed, a miniature eReader uses a miniature display from said plurality of possible miniature displays, a miniature television uses a miniature display from said plurality of possible miniature displays, a miniature movie player uses a miniature display from said plurality of possible miniature displays, a miniature game console uses a miniature display from said plurality of possible miniature displays, a miniature computer uses a miniature display from said plurality of possible miniature displays, and a miniature video receiver uses a miniature display from said plurality of possible miniature displays. Said miniature video receiver is capable of receiving audio and video data wirelessly and displaying said video data on said miniature display.

More generally, a display means can refer to either said miniature smartphone, or said miniature eReader, or said miniature television, or said miniature movie player, or said miniature game console, or said miniature computer, or said miniature video receiver. In addition, said display means has features which can include: a neural interface, gesture-base user interface, power harvesting functionality, head-tracking, eye-tracking, blink detection, voice recognition, speech recognition, panoramic viewing functionality of a plurality of virtual display screens, simultaneous viewing functionality of a plurality of virtual display screens, said optics means, and wireless access to mouse, keyboard, and other input devices. In another embodiment, said display means includes miniature said HMD electronics. In addition, in one embodiment, said display means can digitally adjust screen size. Also, in one embodiment, said display means includes a wireless power receiver. In one embodiment, said wireless power receiver enables wireless charging of the display means battery included within said display means. In one embodiment, said wireless power receiver is a loop antenna. In another embodiment, said wireless power receiver is a coil. In one embodiment, wireless power transfer is based upon inductive coupling. In another embodiment, wireless power transfer is based upon resonant coupling. In yet another embodiment, wireless power transfer is based upon radiative transfer. In one embodiment, said battery can be charged via sunlight, and thus is referred to here as a solar battery. In another embodiment, said battery can be charged via magnetic induction, and thus is referred to here as an induction battery. Products like PowerMat and Enercell use wireless charging based upon magnetic induction to charge batteries wirelessly, where said batteries are inside consumer products such as smartphones and ipods. In the present disclose, charging and recharging will be referred to simply as charging.

In yet another embodiment of said display means, said display means is transparent when powered OFF, and will be referred to here as a transparent display means. Said transparent display means can be made transparent by using materials that can include the following: Transparent Conductive Oxide (TCO) wiring, such as Indium Tin Oxide wiring; transparent batteries; transparent memory; transparent Integrated Circuits (ICs); and transparent miniature displays. In another embodiment of said display means, said display means is bendable, made from flexible electronics. In still another embodiment of said display means, said display means is stretchable, made from stretchable electronics. See Batzill, Matthias and Diebold, Ulrike, "The surface and materials science of tin oxide", *Progress in Surface Science* 79 (2005) 47-154; Vieru, Tudor and Cui, Yi, "Stanford Experts Develop Transparent, Flexible Batteries", *Stanford Report* (Jul. 26, 2011); Yang, Yuan and Cui, Yi, "Transparent lithium-ion batteries", *Proceedings of the National Academy of Sciences (PNAS)* (Jul. 25, 2011); Seo, Jung Won and Park, Jae-Woo, "Transparent resistive random access memory and its characteristics for nonvolatile resistive switching", *Applied Physics Letters* 9 (Dec. 3, 2008) (3 pages); and Wager, John, "World's First Transparent Integrated Circuit", *Oregon State University press*, March 2006; and *Technology* Quarterly Q1, "Stretchable Electronics: A shapely future for circuits", *The Economist* (Mar. 10, 2011).

In one embodiment, said display means includes an electrochromic lens. In another embodiment, said transparent display means has an electrochromic lens sandwiched in front of said miniature display, where said miniature display is included within said transparent display means. In one embodiment, said electrochromic lens is transparent when said transparent display means is powered OFF, and where said electrochromic lens is a focusing lens, or a magnifying lens, or both a focusing and magnifying lens, while said transparent display means is powered ON. One example of a transparent electrochromic lens is a plano lens. In another embodiment, said display means includes an electrochromic screen. In still another embodiment, said transparent display means has an electrochromic screen sandwiched behind said miniature display, where said miniature display is included within said transparent display means, where said electrochromic screen is transparent when said transparent display means is powered OFF, and where said electrochromic screen is either partially opaque, or fully opaque, while said transparent display means is powered ON. Said partially opaque said electrochromic screen enables said miniature display included within said transparent display means to be used for augmented reality applications. Said fully opaque said electrochromic screen enables said miniature display included within said transparent display means to be used for movies, entertainment, and productivity applications like Microsoft Office. Said fully opaque said electrochromic screen is analogous to the silver screens in movie theatres, upon which movies are shown. In another embodiment, said transparent display means includes both said electrochromic lens sandwiched in front of said miniature display, and said electrochromic screen sandwiched behind said miniature display, where said miniature display, said electrochromic lens, and said electrochromic screen are all included within said transparent display means. See Sotzing, Gregory, "A simple, low waste and versatile procedure to make polymer electrochromic devices", *Journal of Materials Chemistry* Volume 21, pp. 11873-11878 (Jul. 7, 2011).

The detailed embodiments disclosed can be used with fashionable eyewear and fashionable nosewear. Designers and manufacturers of said fashionable eyewear include Luxottica, Safilo, Marchon, Silhouette, De Rigo, Marcolin, Foster Grant, and others. Said fashionable eyewear includes prescription eyeglasses and sunglasses, non-prescription eyeglasses and sunglasses, sports goggles, safety goggles, and other safety eyewear. Said fashionable nosewear includes pince-nez mountings, where said pince-nez mountings were popular in America from the mid-$19^{th}$ to mid-$20^{th}$ centuries, symbolized money and status, and represented the cutting edge of fashion. Indeed said pince-nez mountings were often made of precious metals and gems, and thus considered as jewelry. The four categories of said pince-nez mountings covered by the present disclosure include: (1) Hardbridge, (2) Hoop spring, (3) Astig, and (4) Oxford. Examples of said pince-nez mountings are illustrated in the following references: Alan (Feb. 5, 2008), "Little Pieces of Jewelry on the Nose", http://pincenez1.blogspot.com/2008/02/little-pieces-of-jewelry-on-nose.html; and Alan (Mar. 16, 2008), "Little Pieces of Jewelry for the Nose, Part II", http://pincenez1.blogspot.com/2008/03/little-pieces-of-jewelry-on-nose-part.html. Unlike said pince-nez mountings, which have been designed traditionally with fixed pince-nez mounting attachment means for holding lenses, the present disclosure uses a pince-nez mounting means. Said pince-nez mounting means can support a plurality of possible said pince-nez mounting attachment means. More specifically, said plurality of possible said pince-nez mounting attachment means includes the following: fixed pince-nez mounting attachment means for holding lenses, fixed pince-nez mounting attachment means for holding said display means, fixed pince-nez mounting attachment means for holding press-on displays, rotational pince-nez mounting attachment means for holding lenses, rotational pince-nez mounting attachment means for holding said display means, rotational pince-nez mounting attachment means for holding press-on displays, telescoping pince-nez mounting attachment means for holding lenses, telescoping pince-nez mounting attachment means for holding said display means, and telescoping pince-nez mounting attachment means for holding press-on displays. Thus, said pince-nez mounting means expands the functionality and usefulness of said pince-nez mountings. In one embodiment, the material used to make said pince-nez mounting means is transparent. In one embodiment, the material used to make said pince-nez mounting attachment means is transparent. In one embodiment, the material used to make said pince-nez mountings is transparent.

Figure 1:
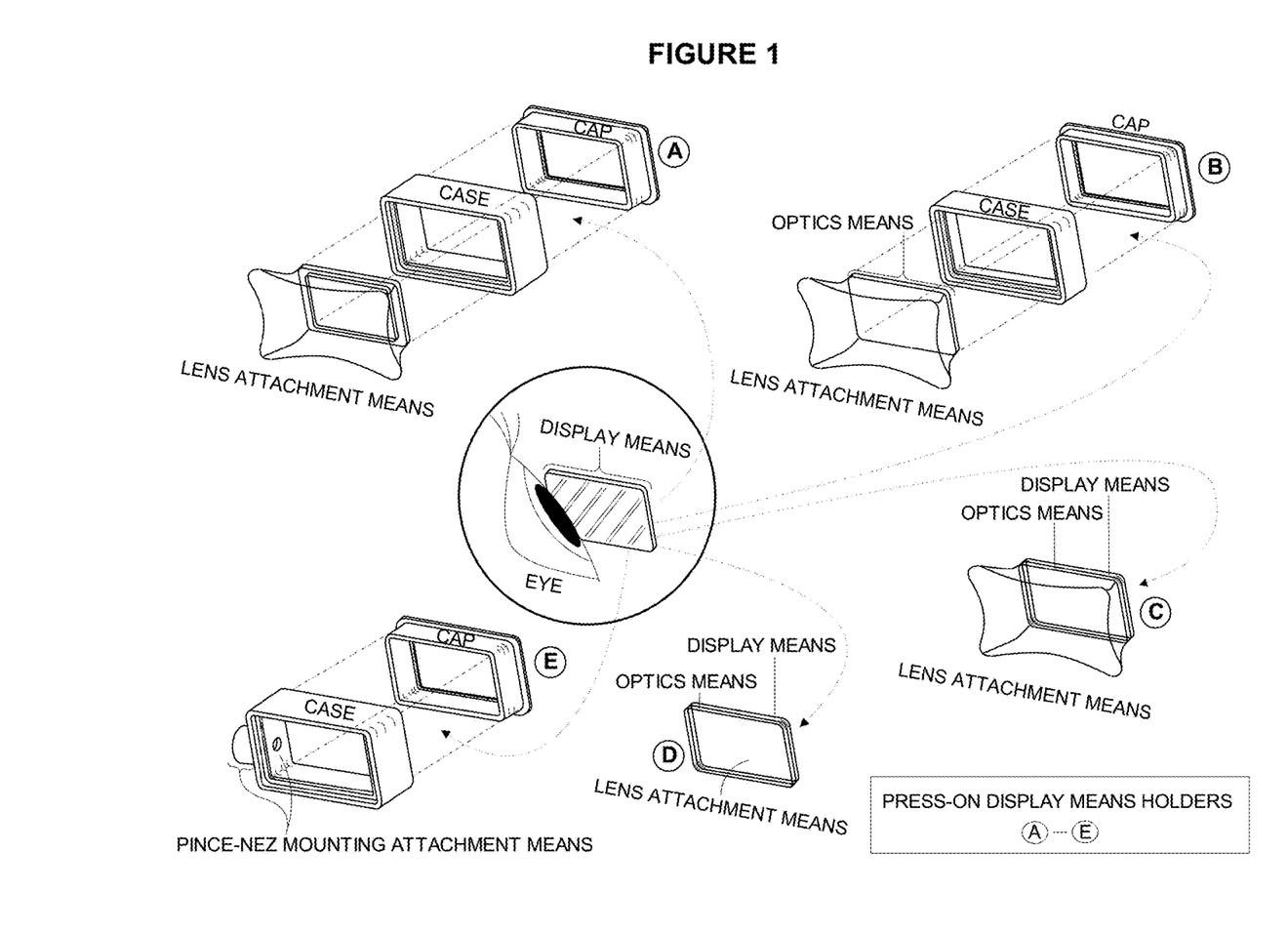
FIG. 1 illustrates exploded perspective views of press-on display means holders

FIG. 1 illustrates exploded perspective views of five of many possible embodiments of a press-on display means holder. Embodiment A of said press-on display means holder includes a cap, a case, and a lens attachment means. Said case and said cap of said embodiment A have room sufficient to hold both an optics means and said display means. In one embodiment, said lens attachment means uses an adhesive means to attach said press-on display means holder to a lens for fashionable eyewear and nosewear. Said adhesive means can include chemical means, mechanical means, and electromagnetic means. Embodiment B of said press-on display means holder includes a cap, a case, and a lens attachment means. Said case and said cap of said embodiment B have room sufficient to hold said display means. Said optics means is integrated with said lens attachment means, where said lens attachment means is used to attach said press-on display means holder to said lens for fashionable eyewear and nosewear. Embodiment C of said press-on display means holder eliminates the need for said cap and said case by securing said display means directly onto said optics means, where said optics means is integrated with said lens attachment means. Thus, embodiment C of said press-on display means holder is a lens attachment means. Embodiment D of said press-on display means holder eliminates the need for said cap and said case by securing said display means directly onto said optics means, where said lens attachment means is an adhesive means integrated onto the surface of said optics means. Thus, embodiment D of said press-on display means holder is an optics means. Embodiment E of said press-on display means holder includes a cap, a case, and a pince-nez mounting attachment means. Said case and said cap of said embodiment E have room sufficient to hold both an optics means and said display means. Said pince-nez mounting attachment means is used to attach said press-on display means holder to a pince-nez mounting means.

One embodiment of the present disclosure covers said press-on display means holder, wherein said press-on display means holder can include combinations of the following: a case, a cap, a lens attachment means, a pivot attachment means, an optics means. The present disclosure covers said press-on display means holder, wherein said press-on display means holder is a battery. The present disclosure covers said press-on display means holder, wherein said press-on display means holder is an electrical conductor. The present disclosure covers said press-on display means holder, wherein said press-on display means holder is made of transparent materials, i.e. said press-on display means holder is transparent. Some of many possible examples of said transparent materials are silicone and graphene. The present disclosure also covers said press-on display means holder, wherein said press-on display means holder is a transparent magnet. See Ziolo, Ronald, "See-Through Magnets—Value of the First Step", *R&D Innovator* Volume 3, Number 11 (November 1994); and Pennisi, Elizabeth, "Nanotechnology yields transparent magnet—tiny iron oxide particles become more transparent than in bulk form", Sciences Services Group (1992).

The first detailed embodiment disclosed is a method for a press-on display, comprising:
  a. securing a display means to a press-on display means holder, and
  b. attaching said press-on display means holder to a lens for fashionable eyewear and nosewear, or to a pince-nez mounting attachment means,
  whereby press-on displays, attached to lenses for fashionable eyewear and nosewear, will provide a socially acceptable alternative to head-mounted displays.

Figure 2:
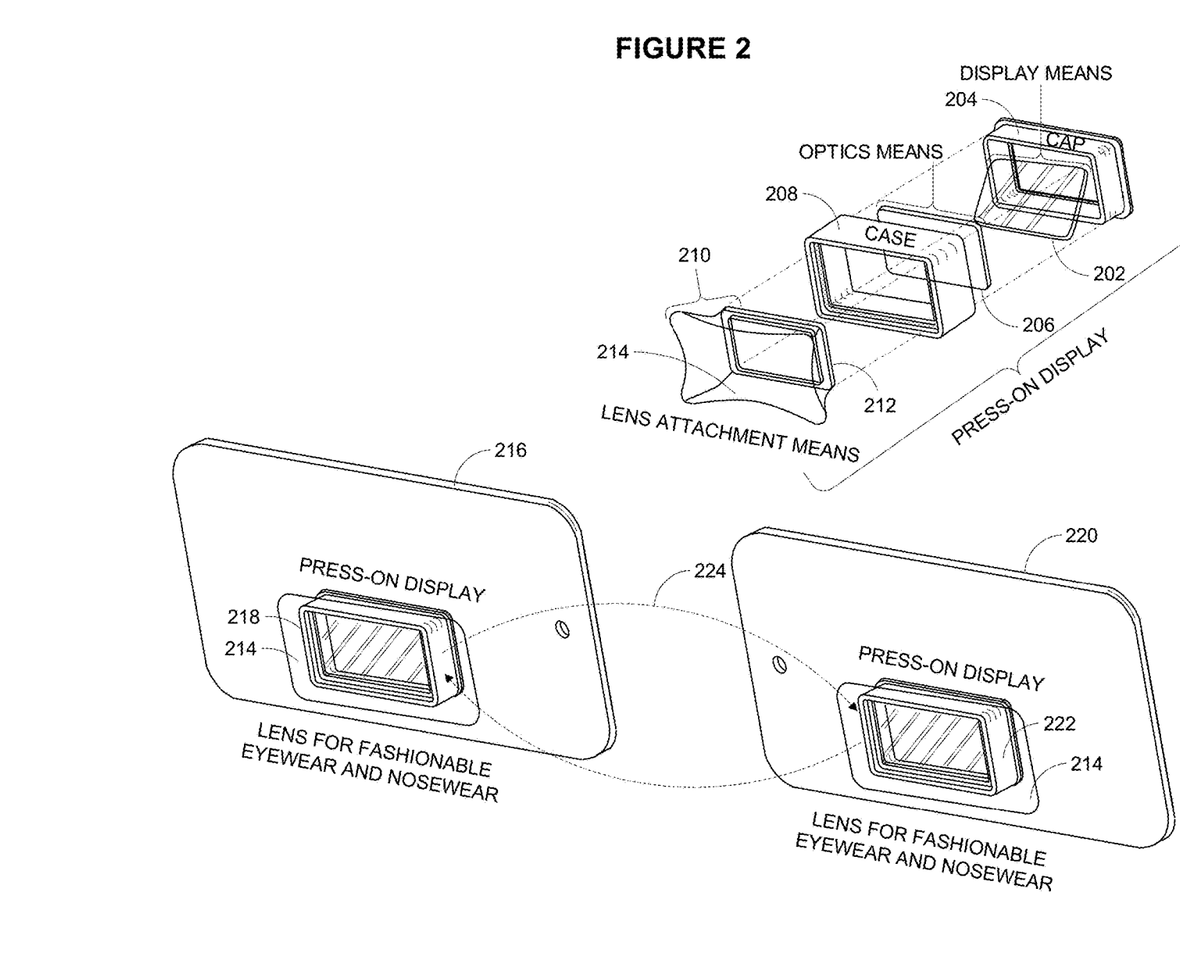
FIG. 2 illustrates an exploded perspective view of the first detailed embodiment disclosed

FIG. 2 illustrates an exploded perspective view of said first detailed embodiment disclosed, further including securing said optics mean to said press-on display means holder. More specifically, said display means 202 is placed first inside of said cap 204. Secondly, said optics means 206 is placed inside of said cap 204, in front of said display means 202. Thirdly, said cap 204, containing said display means 202 and said optics means 206, is inserted into said case 208. Fourthly, one embodiment, from a plurality of possible embodiments, of said lens attachment means 210 has a transparent backplate 212, where said transparent backplate 212 can be secured with an adhesive means to said case 208. Said adhesive means can include chemical means, mechanical means, and electromagnetic means. Finally, one embodiment, from a plurality of possible embodiments, of said lens attachment means 210 has a transparent adhesive band 214, where said transparent adhesive band 214 is capable of conforming to the shape of said lens for fashionable eyewear and nosewear 216 when said press-on display 218 is pressed onto said lens for fashionable eyewear and nosewear 216, and capable of conforming to the shape of said lens for fashionable eyewear and nosewear 220 when said press-on display 222 is pressed onto said lens for fashionable eyewear and nosewear 220. Said transparent adhesive band 214 is secured to said lens for fashionable eyewear and nosewear with an adhesive means applied to the inside surface of said transparent adhesive band 214. Said adhesive means can include chemical means, mechanical means, and electromagnetic means. In one embodiment, said press-on display 218, which is associated with the left eye, and said press-on display 222, which is associated with the right eye, can be configured 224 to present the same image, viewable as a single two-dimensional image. In another embodiment, said press-on display 218, which is associated with the left eye, and said press-on display 222, which is associated with the right eye, can be configured 224 to present different stereoscopic images that are interpreted by the viewer as a single three-dimensional image. Also, the present disclosure covers said method for a press-on display, wherein said lens for fashionable eyewear and nosewear is a magnet. In one embodiment, said magnet is a transparent magnet.

In one embodiment of the present disclosure, a flexible transparent battery can be attached to the surface of said lens for fashionable eyewear and nosewear, where said lens for fashionable eyewear and nosewear can be a prescription lens for fashionable eyewear and nosewear or a non-prescription lens for fashionable eyewear and nosewear. Said flexible transparent battery can provide power to devices, such as said display means, for example.

More generally, the present disclosure discloses a method for a dual-use lens for fashionable eyewear and nosewear, comprising:
  a. attaching a flexible transparent battery to the surface of a prescription lens or a non-prescription lens, and
  b. charging said flexible transparent battery wirelessly using a wireless power receiver,
  whereby dual-use lenses provide power to electronic devices, such as said display means and a neural communicator means.

The present disclosure covers the method for a dual-use lens for fashionable eyewear and nosewear, wherein said wireless power receiver is included with said flexible transparent battery. The present disclosure also covers the method for a dual-use lens for fashionable eyewear and nosewear, wherein said wireless power receiver is included with said lens attachment means. Said wireless power receiver enables wireless charging of said flexible transparent battery. In one embodiment, said wireless power receiver is a loop antenna. In another embodiment, said wireless power receiver is a coil. The present disclosure covers the method for a dual-use lens for fashionable eyewear and nosewear, wherein a wireless power transmitter is included with said flexible transparent battery. The present disclosure also covers the method for a dual-use lens for fashionable eyewear and nosewear, wherein said wireless power transmitter is included with said lens attachment means. In one embodiment, the surface of said flexible transparent battery is made of conductive materials. Unlike U.S. Pat. No. 7,931,832 B2 where a media containing a battery is injected into a cavity within a lens, the present disclosure attaches said flexible transparent battery to the surface of said lens for fashionable eyewear and nosewear. See Vieru, Tudor and Cui, Yi, "Stanford Experts Develop Transparent, Flexible Batteries", *Stanford Report* (Jul. 26, 2011); Yang, Yuan and Cui, Yi, "Transparent lithium-ion batteries", *Proceedings of the National Academy of Sciences* (*PNAS*) (Jul. 25, 2011).

Another embodiment is a method for a dual-use lens for fashionable eyewear and nosewear, comprising:
  a. adding a vision correction functionality to a transparent battery, to enable said transparent battery to function as a prescription lens or a non-prescription lens, and
  b. charging said transparent battery wirelessly using a wireless power receiver,
whereby dual-use lenses provide power to electronic devices, such as said display means and a neural communicator means.

In one embodiment of said cap 204, said cap 204 is a transparent battery, where in one embodiment said transparent battery has a wireless power transceiver, where said wireless power transceiver functions both as said wireless power receiver and as said wireless power transmitter. In one embodiment of said case 208, said case 208 is a transparent battery. In one embodiment, said case 208 is said transparent battery with said wireless power transceiver. In one embodiment of said lens attachment means 210, said lens attachment means 210 is a transparent battery. In one embodiment, said lens attachment means 210 is said transparent battery with said wireless power transceiver. In one embodiment, said battery can be charged via sunlight, and thus is referred to here as a solar battery. In another embodiment, said battery can be charged via magnetic induction and said wireless power transceiver. Products like PowerMat and Enercell use wireless charging based upon magnetic induction to charge batteries wirelessly, where said batteries are inside consumer products such as smartphones and ipods. In one embodiment of said cap 204, said cap 204 is bendable, flexible. In another embodiment of said cap 204, said cap 204 is stretchable. In one embodiment of said case 208, said case 208 is bendable, flexible. In another embodiment of said case 208, said case 208 is stretchable. In one embodiment of said lens attachment means 210, said lens attachment means 210 is bendable, flexible. In another embodiment of said lens attachment means 210, said lens attachment means 210 is stretchable. In one embodiment of said optical means 206, said optical means 206 is bendable, flexible. In another embodiment of said optical means 206, said optical means 206 is stretchable. In one embodiment of said backplate 212, said backplate 212 is bendable, flexible. In another embodiment of said backplate 212, said backplate 212 is stretchable. In one embodiment of said display means 202, said display means 202 is bendable, made from flexible electronics. In another embodiment of said display means 202, said display means 202 is stretchable, made from stretchable electronics.

Figure 3:
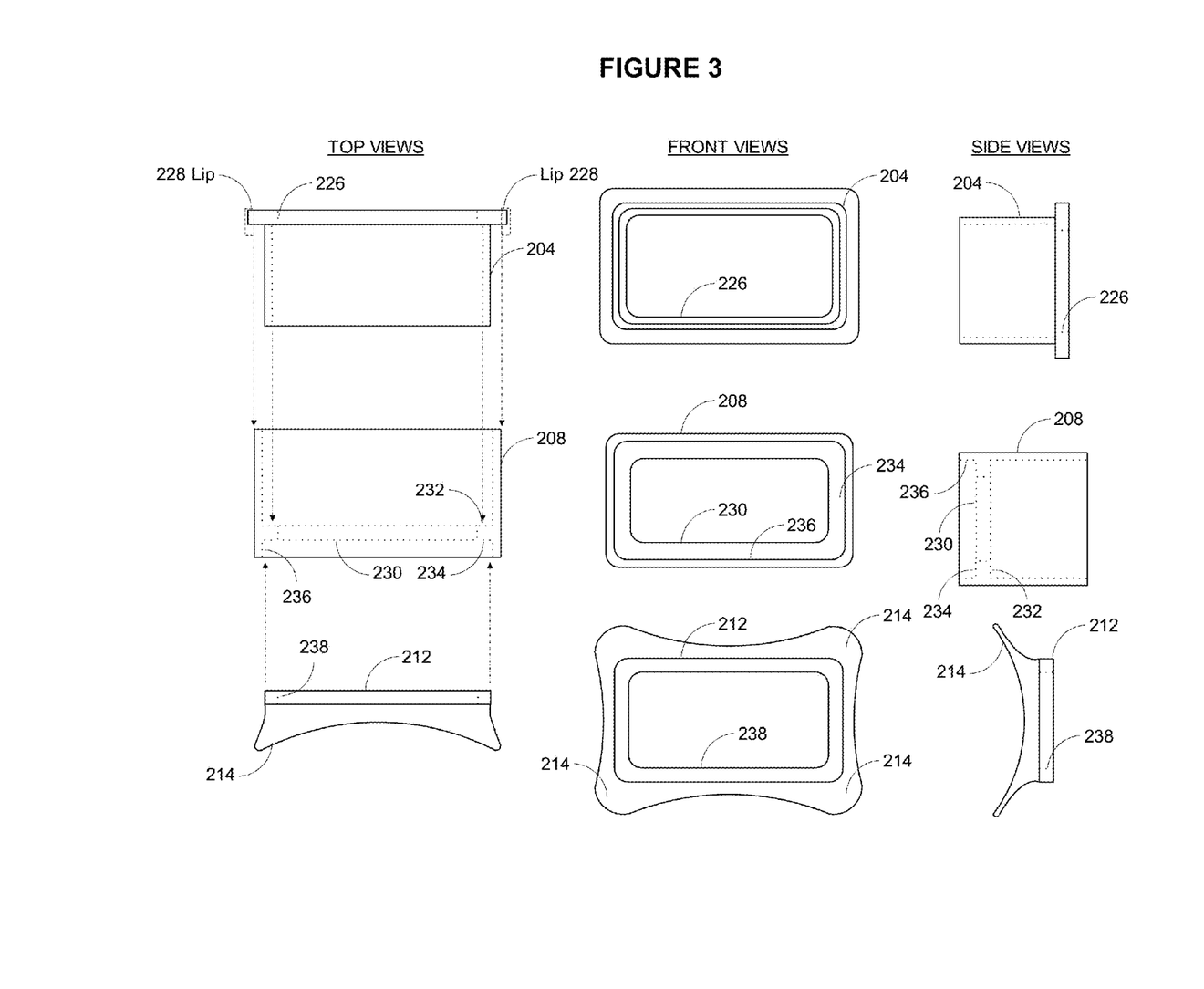
FIG. 3 illustrates front views, side views, and top views, of press-on display means holder in FIG. 2.

FIG. 3 illustrates the Top Views, Front Views, and Side Views of the press-on display means holder illustrated in FIG. 2. Since the backside of said display means 202 can contain a plurality of features that can include cameras, projectors, microphones, and speakers, one embodiment of said cap 204 includes a viewport 226, where said viewport 226 supports the use of said plurality of features of said display means 202. Said first detailed embodiment disclosed provides an overhanging lip 228, where said overhanging lip 228 is used to separate said cap 204 from said case 208. In one embodiment of said case 208, said case 208 includes a viewpoint 230, a cap-stop 232, and a lens attachment-stop 234. Said cap-stop 232 limits how far into said case 208 said cap 204 is allowed. Said lens attachment-stop 234 limits how far into said case 208 said lens attachment means 210 is allowed. In one embodiment, said transparent backplate 212 is secured to the surface of said lens attachment-stop 234. In another embodiment, said transparent backplate 212 is secured to surface 236. In still another embodiment, said transparent backplate 212 is secured to said surface of said lens attachment-stop 234 and to surface 236. Said transparent backplate 212 is secured using an adhesive means, where said adhesive means can include a chemical means, mechanical means, or electromagnetic means. In one embodiment of said lens attachment means 210, said transparent backplate 212 includes a viewport 238. In another embodiment of said lens attachment means 210, said transparent backplate 212 is solid, and does not contain a viewport. In yet another embodiment of said lens attachment means 210, said transparent backplate is replaced with said optical means. In one embodiment of said press-on display, said display means 202, said cap 204, said optics means 206, said case 208, and said lens attachment means 210, can be made of one or a plurality of materials that are lightweight, with a high strength-to-weight ratio, such as appropriate plastics, or graphene. In another embodiment of said press-on display, said display means 202, said cap 204, said optics means 206, said case 208, and said lens attachment means 210, can be made of one or a plurality of materials that are transparent, such as appropriate plastics, or graphene. In another embodiment of said press-on display, said cap 204, said optics means 206, said case 208, and said lens attachment means 210, can each be electrical conductors, capable of supplying power to said display means 202 or to said optics means 206, where said optics means is an electrochromic lens.

The second detailed embodiment disclosed is a method for neural pince-nez nosewear, comprising:
  a. attaching a neural communicator means to a pince-nez mounting means, and
  b. clipping said pince-nez mounting means onto the bridge of the nose,
whereby the wearer can communicate wirelessly with electronic devices, such as said display means, via the thoughts of said wearer.

Figure 4:
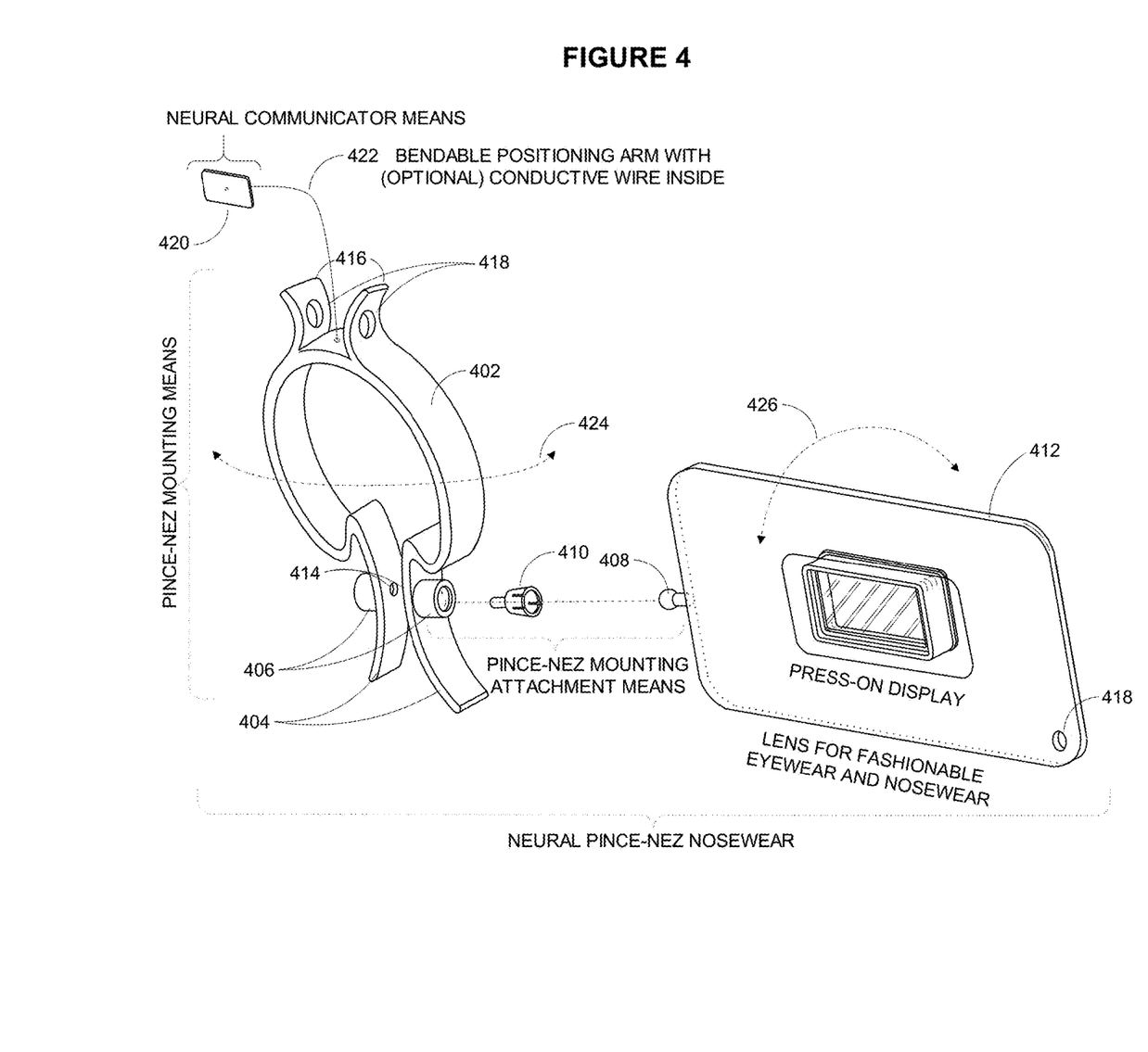
FIG. 4 illustrates an exploded perspective view of the second detailed embodiment disclosed, using said lens for fashionable eyewear and nosewear

FIG. 4 illustrates said method for neural pince-nez nosewear, further including the following: (1) press-on display (2) lens for fashionable eyewear and nosewear (3) pince-nez mounting attachment means (4) bendable positioning arm. An embodiment of said second detailed embodiment disclosed is said method for neural pince-nez nosewear, wherein said pince-nez mounting means can support a plurality of possible said pince-nez mounting attachment means. FIG. 4 illustrates an exploded perspective view of said second detailed embodiment disclosed, wherein said pince-nez mounting means supports a rotational pince-nez mounting attachment means, and further including said press-on display attached to said lens for fashionable eyewear and nosewear. Said pince-nez mounting means clips onto the bridge of the nose and can support one or two said pince-nez mounting attachment means, one or two said lens for fashionable eyewear and nosewear, one or two said press-on displays or display means, said neural communicator means, and a positioning arm. Said pince-nez mounting means uses one or more spring means 402 to squeeze said bridge of said nose. In one embodiment, said spring means 402 is shaped approximately like the letter C tilted on its side. Said spring means 402 can be any material, method, or device capable of squeezing said bridge of said nose. A comfort means 404 is positioned at the end of said spring means 402. More specifically, one or more spring means 402 squeeze comfort means 404, which causes said comfort means 404 to squeeze said bridge of the nose.

The present disclosure covers said method for neural pince-nez nosewear, wherein said pince-nez mounting means includes a comfort means 404, where said comfort means 404 can use any combination of a plurality of possible materials, shapes, hinges, and the like, that can enhance comfort for wearer. Some of a plurality of possible examples of said plurality of possible materials can include silicon, liquid gel packs, and liquid-solid-gas hybrid materials. In one embodiment, said comfort means is hinged to said spring means 402. In another embodiment, said comfort means is not hinged, as illustrated in 404. In still another embodiment, said comfort means 404 can be coated with a Gecko-Inspired Synthetic Adhesive (GSA), which is based on van der waal forces, and which allow Gecko lizards to walk on walls and ceilings. Said comfort means use said gecko-inspired synthetic adhesive, to help prevent slippage of said comfort means 404 on said nose. Thus, said comfort means can use any combination of a plurality of possible materials, where said plurality of possible materials can include a gecko-inspired synthetic adhesive. One of a plurality of companies making products based upon said gecko-inspired synthetic adhesive is nanoGriptech, Inc.

One of many possible embodiments of said pince-nez mounting attachment means is illustrated in FIG. 4, where said pince-nez mounting attachment means includes pivot attachments 406 and 408, and a gasket 410. In one embodiment, said pivot attachments 406 are integrated with said comfort means 404, and said pivot attachments 408 is integrated with said lens for fashionable eyewear and nosewear 412. A pivot attachment can refer to either a female pivot attachment, illustrated in 406, or a male pivot attachment, illustrated in 408. Said female pivot attachment is mated with, and inserted into, said male pivot attachment. Said male pivot attachment is mated with, and inserted into, said female pivot attachment. Also, said gasket 410 is used to lock together said male pivot attachment and said female pivot attachment. Locked male and female pivot attachments can be unlocked by pushing on the small end of said gasket 410, through openings 414. Said second detailed embodiment disclosed can use a plurality of different pivot attachment means. The one specific example of said plurality of different pivot attachment means presented here is discussed in U.S. Pat. No. 5,076,701 and U.S. Pat. No. 4,603,944. One embodiment of said second detailed embodiment uses a pivot attachment means that does use said gasket 410. Another embodiment of said second detailed embodiment uses a pivot attachment means that does not use said gasket 410.

Said second detailed embodiment disclosed use fingerpieces 416 to don and remove said pince-nez mounting means, using two fingers of one hand. More specifically, in order to clip said pince-nez mounting means onto said nose, the wearer simply squeezes together the pair of fingerpieces 416 to expand said pince-nez mounting means, and then simply releases said pair of fingerpieces 416 after placing said pince-nez mounting means onto said noise, to clip onto said bridge of the nose. In one embodiment, said fingerpieces 416 can be coated with said Gecko-inspired synthetic adhesive (GSA), to reduce the possibility of slippage when squeezing said fingerpieces 416 with said two fingers. A lanyard, ribbon loop, security chain, or the like can be connected to said neural pince-nez nosewear at lanyard connection points 418, to hold said neural pince-nez nosewear when not being worn on said nose. Another embodiment is said method for neural pince-nez nosewear, wherein said pince-nez mounting means is a battery. Still another embodiment is said method for neural pince-nez nosewear, wherein said pince-nez mounting means transmits bone conduction audio to inner ears via bones of said bridge of said nose. Yet another embodiment is said method for neural pince-nez nosewear, wherein said pince-nez mounting means is a magnet. In still another embodiment is said method for neural pince-nez nosewear, wherein said pince-nez mounting means is a transparent magnet. See Ziolo, Ronald, "See-Through Magnets—Value of the First Step", *R&D Innovator* Volume 3, Number 11 (November 1994); and Pennisi, Elizabeth, "Nanotechnology yields transparent magnet—tiny iron oxide particles become more transparent than in bulk form", Sciences Services Group (1992).

In said second detailed embodiment disclosed, said neural pince-nez nosewear includes said neural communicator means 420, where said neural communicator means 420 is held in place with a bendable positioning arm 422. FIG. 4 illustrates said method for neural pince-nez nosewear, wherein said attaching is performed using said bendable positioning arm 422. In one embodiment, said bendable positioning arm includes a conductive wire inside said bendable positioning arm 422, where said conductive wire is used to transfer power from said pince-nez mounting means to said neural communicator means 420, where said pince-nez mounting means is a battery. In one embodiment, said bendable positioning arm 422 includes a TCO wire inside. Note that when only one press-on display means is used, said neural pince-nez nosewear illustrated in FIG. 4 enables the wearer to easily switch between viewing said press-on display means using the left eye, and viewing said press-on display means using the right eye, by simply rotating 424 said pince-nez mounting means by about 180 degrees, rotating 426 said lens for fashionable eyewear and nosewear 412 by about 180 degrees, and re-positioning said bendable positioning arm 422. The present disclosure covers the method for neural pince-nez nosewear, wherein said neural communicator means and said pince-nez mounting means are transparent.

Figure 5:
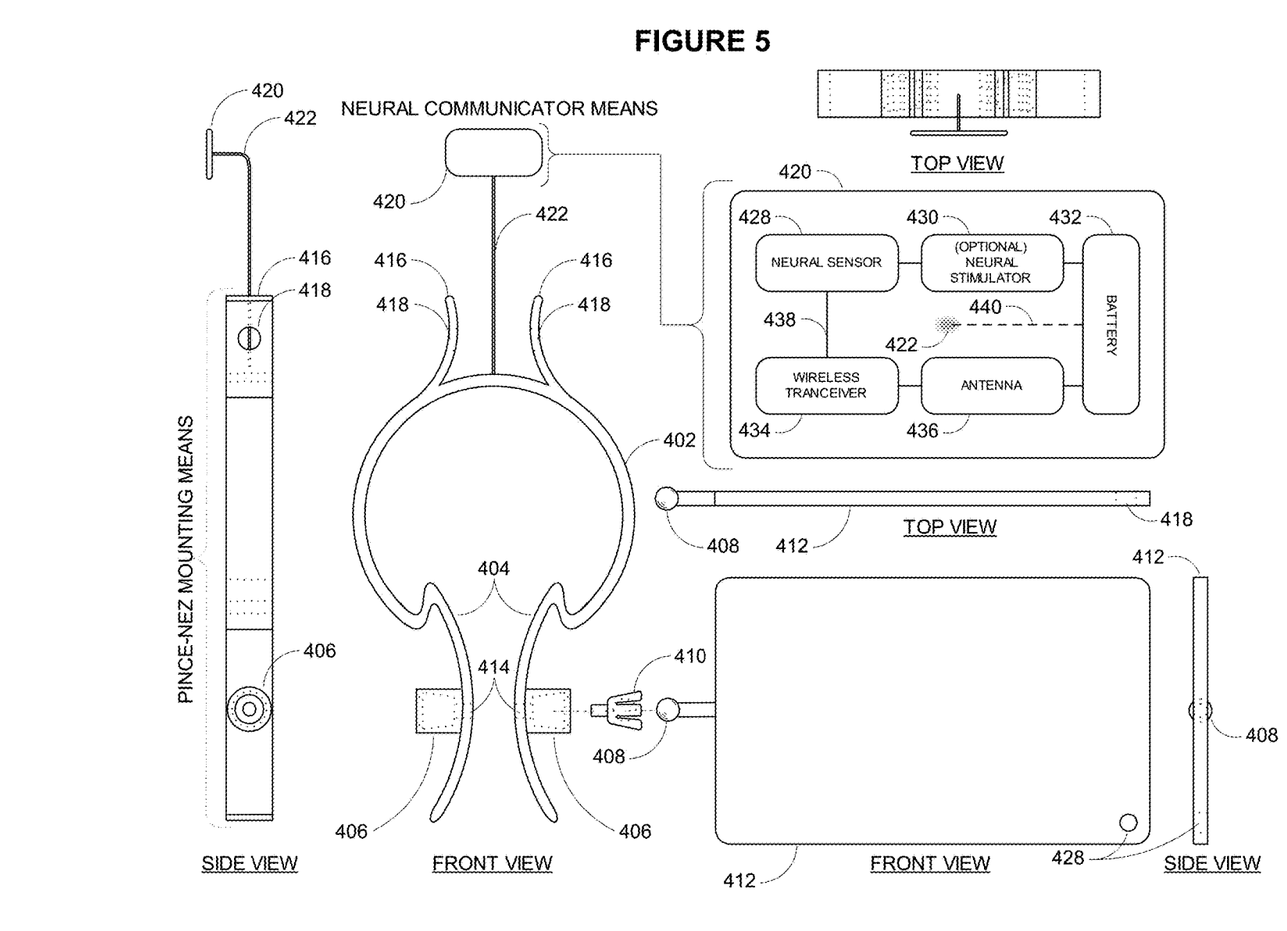
FIG. 5 illustrates front views, side views, and top views associated with FIG. 4

FIG. 5 illustrates the Top Views, Front Views, and Side Views associated with said neural pince-nez nosewear illustrated in FIG. 4. In one of many possible embodiments, said neural communicator means 420 includes a neural sensor. In another embodiment, said neural communicator means 420 includes a neural stimulator. In yet another embodiment, said neural communicator means 420 includes both a neural sensor and a neural stimulator. In FIG. 5, one embodiment of said neural communicator means 420 is illustrated, which includes the following components: a neural sensor 428, a neural stimulator 430, a neural communicator battery 432, a wireless communications transceiver 434, an antenna 436, a link 438 to connect said components, and said TCO wire 440 included within said bendable positioning arm 422. Said neural communicator means 420 gets power from said neural communicator battery 432, or from said TCO wire 440, or from both said neural communicator battery 432 and said TCO wire 440. In one embodiment, said wireless communications transceiver 434 uses antenna 436 to enable communication between said neural communicator means 420 and said display means. In one embodiment, said neural communicator battery 432 includes said wireless power receiver, to enable the wireless charging of said neural communicator battery 432. In another embodiment, said wireless communications transceiver 434 uses antenna 436 to enable communication between said neural communicator means 420 and non-eyewear computing devices. In yet another embodiment, said wireless communications transceiver 434 uses antenna 436 to enable communication between said neural communicator means 420 and non-nosewear computing devices.

In one embodiment, said neural sensor 428 detects the wearer's brainwave emissions and uses said wireless communications transceiver 434 and antenna 436 to transmit said brainwave emissions to said display means, where said display means includes a neural interface. Said brainwave emissions covered by the present disclosure have a plurality of classifications, where said plurality of classifications can include: ElectroEncephaloGram/ElectroEncephaloGraphy (EEG), muscle ElectroMyoGraphy (EMG), ElectroOculoGram (EOG), ElectroCadioGram (ECG/EKG), and others. Said neural sensor 428 can be used to detect said brainwave emissions associated with smell, taste, touch, sight, and sounds. Note, however, that said display means, which includes said neural interface, has the potential to use said neural communicator means 420, which includes said neural sensor 428, to detect said brainwave emissions associated with thoughts as well, referred to here as Thought Identification, where this insight results from demonstrations in the field of Neuroimaging. Thus, in the present disclosure, thoughts will be classified as one of a plurality of human senses. More specifically, said brainwave emissions include patterns and spikes referred to as Evoked Potentials, where said evoked potentials can be decoded into thoughts, smell, taste, touch, sight, and sounds. Each evoked potential, or set of evoked potentials, corresponds to specific thoughts, smells, tastes, touch, visual images, or sounds. Moreover, said evoked potentials typically appear in the 3 Hertz-50 Hertz frequency range, thus in one embodiment, said neural sensor 428, and said neural stimulator 430, will operate within a frequency range which includes said 3 Hertz-50 Hertz frequency range.

Said display means, which includes said neural interface, uses said neural stimulator 430 for brain stimulation, where said brain stimulation triggers said evoked potentials (events) in said brain. These triggered events create thoughts, taste, touch, sound, smell, and visual images in said brain. To identify the trigger for each region of the brain, the resonance frequency or set of resonance frequencies for the desired region of the brain must be decoded. Note that each person's brain has a unique set of resonance frequencies. However, for each said person's brain, each said resonance frequency, or each unique set of resonance frequencies, typically occurs within the vicinity of the corresponding resonance frequency in the table shown below.

| Brain Region | Resonance Frequency | Event Triggered via Modulation |
| --- | --- | --- |
| Somatosensory Cortex | 09 Hz | Induces Phantom Touch |
| Motor Control Cortex | 10 Hz | Induces Motor Coordination |
| Auditory Cortex | 15 Hz | Induces Sound which Bypasses Ears |
| Thought Center | 20 Hz | Induces Thoughts |
| Visual Cortex | 25 Hz | Induces Images which Bypasses Eyes |

Once decoded, said resonance frequency or set of resonance frequencies is modulated, in order to create the desired trigger event, in the desired region of said brain corresponding to said resonance frequency or set of resonance frequencies. This modulation can be input into said brain at a plurality of intensities, from subliminal to perceptible. Thus, the present disclosure covers the method for neural pince-nez nosewear, wherein said neural communicator means 420 enables the wireless digital sharing of one or said plurality of human senses between humans, where said plurality of human senses include: thoughts, smell, taste, touch, sight, and hearing. More specifically, said display means, which includes said neural interface, can use said neural communicator means 420, which includes said neural sensor 428 and said neural stimulator 430, to share, wirelessly, digitally, one or a plurality of human senses between said humans, where said plurality of human senses can include: thoughts, smell, taste, touch, sight, and hearing. Thus, said brain stimulation has the potential to profoundly enhance the way humans communicate with one another, and will profoundly change many (perhaps all) industries, especially the entertainment industry.

In another embodiment, said neural communicator means 420, using said neural stimulator 430, triggers said evoked potentials (events) that stimulate the desired region of wearer's brain, where said desired region of wearer's brain can include the Motor Control Cortex, Auditory Cortex, Visual Cortex, Somatosensory Cortex, and Thought Center. Two of the leading companies developing neural technologies are NeuroSky, Inc. and Emotiv Systems. NeuroSky is Silicon Valley company which develops and manufactures said neural sensors, and embedded chip level solutions, for implementing neural interfaces, and Emotiv Systems is an Australian electronics company developing said neural interface technology. See: Vidal, J J (1973), "Toward direct brain-computer communication", *Annual review of biophysics and bioengineering* 2: 157-80, doi:10.1146/annurev.bb.02.060173.001105.PMID 4583653; J. Vidal (1977), "*Real-Time Detection of Brain Events in EEG*" *IEEE Proceedings* 65: 633-641, doi:10.1109/PROC.1977.10542, http://www.cs.ucla.edu/~vidal/Real_Time_Detection.pdf; and Lebedev, M A; Nicolelis, M A (2006), "*Brain-machine interfaces: past, present and future.*", *Trends in neurosciences* 29 (9): 536-46, doi: 10.1016/j.tins.2006.07.004.PMID 16859758; http://www.c-s.uu.nl/docs/vakken/mmpi/papers/Lebedev%202006.pdf.

Figure 6:
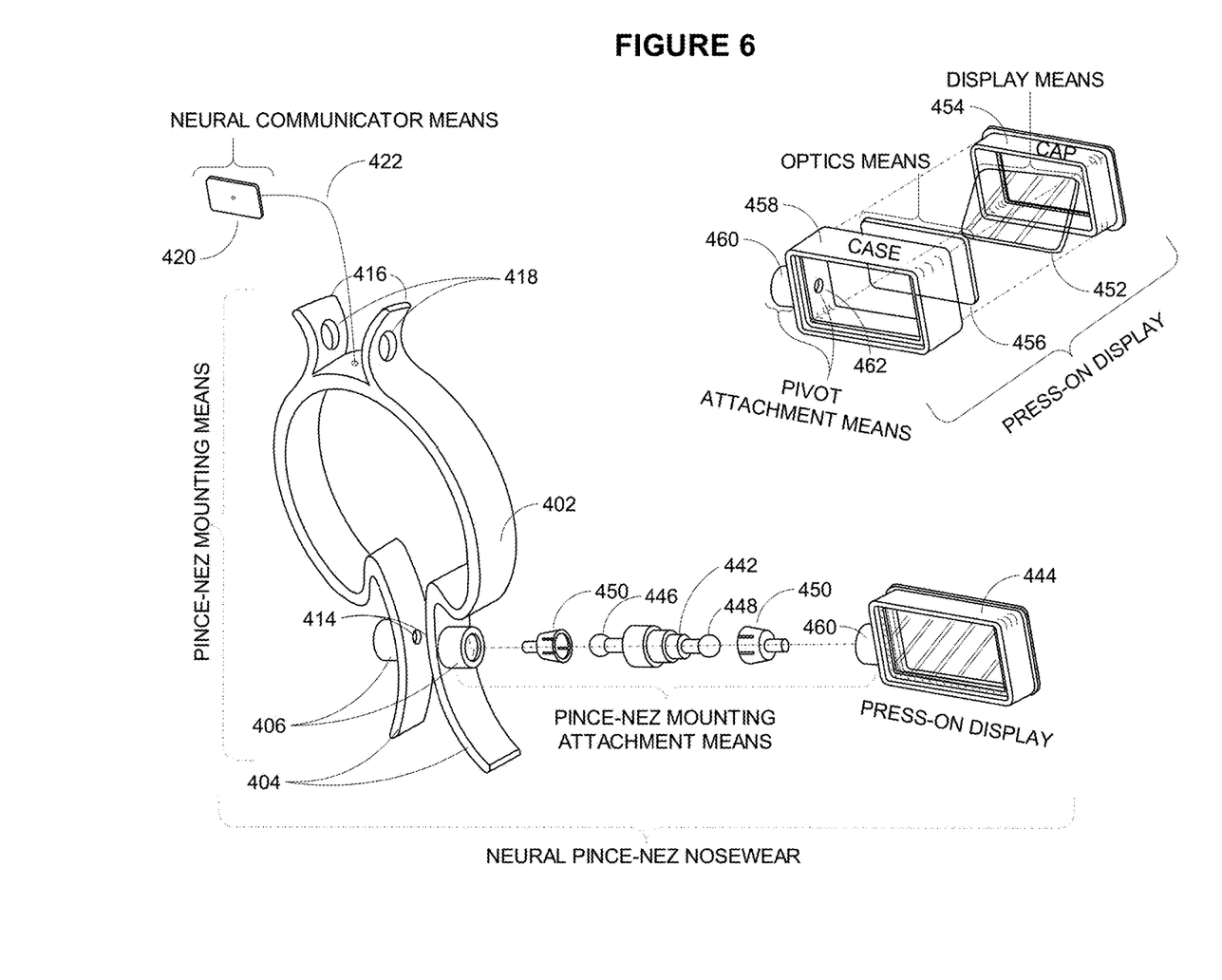
FIG. 6 illustrates an exploded perspective view of the second detailed embodiment disclosed, not using said lens for fashionable eyewear and nosewear

FIG. 6 illustrates an exploded perspective view of said second detailed embodiment disclosed, wherein said pince-nez mounting means supports a telescoping pince-nez mounting attachment means, and further including said press-on display attached to said pince-nez mounting attachment means. Said pince-nez mounting means clips onto the bridge of the nose and can support one or two said pince-nez mounting attachment means, one or two said press-on displays or display means, said neural communicator means, and a positioning arm. In FIG. 6, said pince-nez mounting attachment means has one adjustable telescoping arm 442 for positioning one said press-on display 444 near-to-eye, at adjustable positions, where one end of said one adjustable telescoping arm 442 has a pivot attachment 446 which is mated with, and inserted into, said one of said pivot attachments 406 on said pince-nez mounting means, and where the opposite end of said one adjustable telescoping arm 442 has a pivot attachment 448.

Although said neural pince-nez nosewear illustrated in FIG. 6 is shown using only one said adjustable telescoping arm, clearly said neural pince-nez nosewear can also use two adjustable telescoping arms as well. More specifically, in another embodiment of said neural pince-nez nosewear, two said pince-nez mounting attachment means are used, where each of said two pince-nez mounting attachment means is an adjustable telescoping arm. One of said two pince-nez mounting attachment means is the left telescoping arm, where the left telescoping arm is used for positioning the left said press-on display near left eye, at adjustable positions, where one end of said left telescoping arm has a pivot attachment that is mated with, and inserted into, one of said pivot attachments on said pince-nez mounting means, and where the opposite end of said left telescoping arm has a pivot attachment that is mated with, and inserted into, said pivot attachment on said left said press-on display. The other one of said two pince-nez mounting attachment means is the right telescoping arm, where the right telescoping arm is used for positioning the right said press-on display near right eye, at adjustable positions, where one end of said right telescoping arm has a pivot attachment that is mated with, and inserted into, one of said pivot attachments on said pince-nez mounting means, and where the opposite end of said right telescoping arm has a pivot attachment that is mated with, and inserted into, said pivot attachment on said right said press-on display. In one embodiment, said pince-nez mounting attachment means includes said gaskets 450. In another embodiment, said pince-nez mounting attachment means does not include said gaskets 450. In one embodiment of said pince-nez mounting attachment means, said pince-nez mounting attachment means is bendable, flexible. In another embodiment of said pince-nez mounting attachment means, said pince-nez mounting attachment means is stretchable. In still another embodiment, said pince-nez mounting attachment means is a battery. In another embodiment, said pince-nez mounting attachment means is transparent.

Also illustrated in FIG. 6 is an exploded perspective view of one embodiment of said press-on display, comprising (1) said display means (2) said optics means (3) a case (4) a cap. Said display means 452 is placed first inside of said cap 454. Secondly, said optics means 456 is placed inside of said cap 454, in front of said display means 452. Thirdly, said cap 454, containing said display means 452 and said optics means 456, is inserted into said case 458. Said case 458 includes a pivot attachment 460 integrated into said case 458. Said pivot attachment can refer to either a male pivot attachment, illustrated in 446 and 448, or a female pivot attachment, illustrated in 406 and 460. Said male pivot attachment is mated with, and inserted into, said female pivot attachment. Said female pivot attachment is mated with, and inserted into, said male pivot attachment. In one embodiment, said gaskets 450 are used to lock together said male pivot attachment and said female pivot attachment. Locked male and female pivot attachments can be unlocked by pushing on the small end of said gaskets 450, through openings 414 and 462. The detailed embodiments disclosed can use a plurality of different pivot attachment means. One embodiment uses a pivot attachment means that does use said gaskets 450. Another embodiment uses a pivot attachment means that does not use said gaskets 450.

In one embodiment of said cap 454, said cap 454 is a transparent battery, referred to here as a cap transparent battery. In one embodiment, said cap transparent battery includes said wireless power transceiver. In one embodiment of said case 458, said case 458 is a transparent battery, referred to here as a case transparent battery. In one embodiment, said case transparent battery includes said wireless power transceiver. In one embodiment of said optics means 456, said optics means 456 is a transparent battery, referred to here as an optics means transparent battery. In one embodiment, said optics means transparent battery includes said wireless power transceiver. Products like PowerMat and Enercell use wireless charging based upon magnetic induction to charge batteries wirelessly, where said batteries are inside consumer products such as smartphones and ipods. In one embodiment of said cap 454, said cap 454 is bendable, flexible. In another embodiment of said cap 454, said cap 454 is stretchable. In one embodiment of said case 458, said case 458 is bendable, flexible. In another embodiment of said case 458, said case 458 is stretchable. In one embodiment of said optics means 456, said optics means 456 is bendable, flexible. In another embodiment of said optics means 456, said optics means 456 is stretchable. In one embodiment of said display means 452, said display means 452 is bendable, made from flexible electronics. In another embodiment of said display means 452, said display means 452 is stretchable, made from stretchable electronics.

Figure 7:
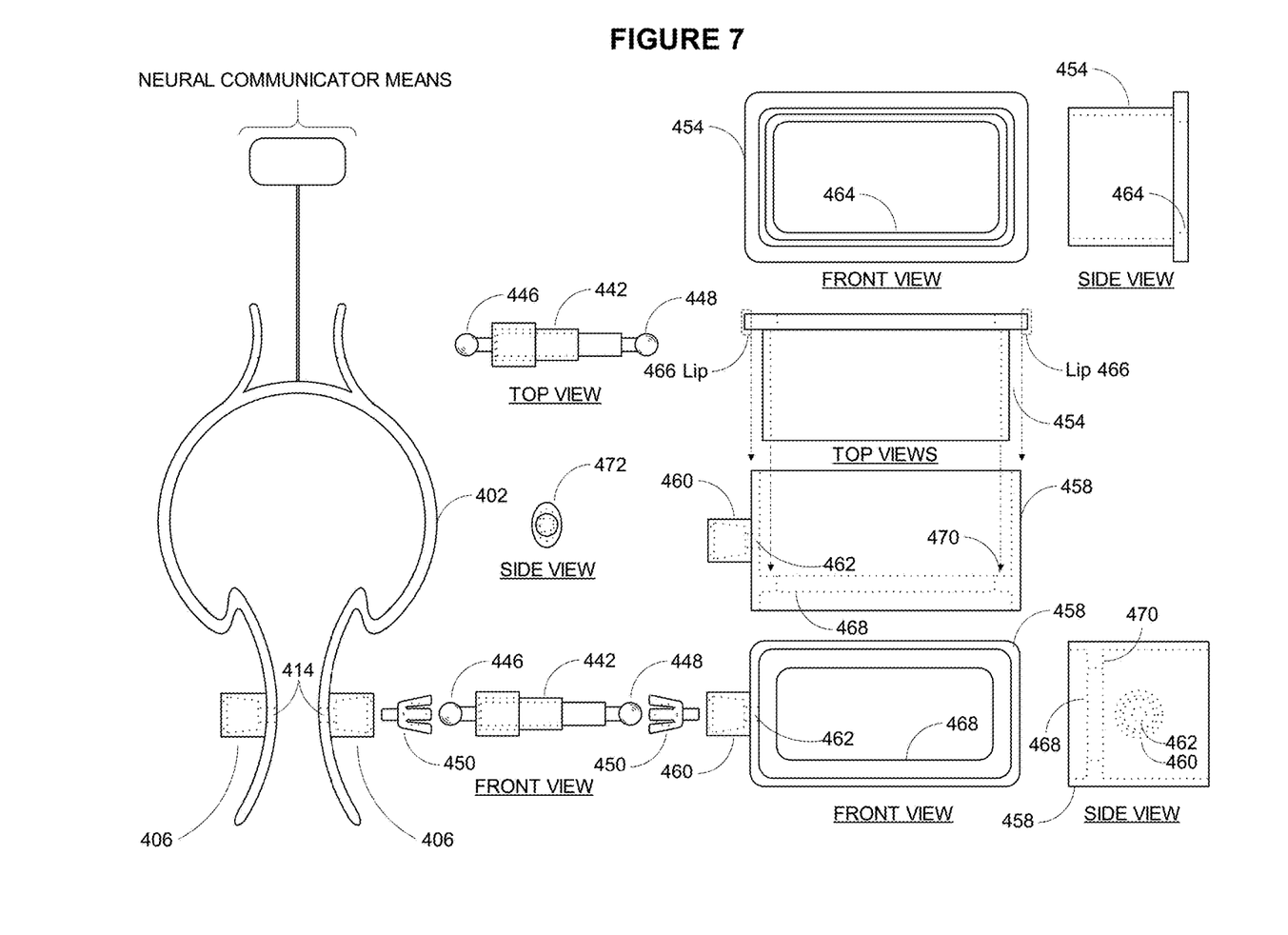
FIG. 7 illustrates front views, side views, and top views associated with FIG. 6

FIG. 7 illustrates the Top Views, Front Views, and Side Views associated with FIG. 6. The backside of said display means 452 can contain a plurality of features that can include: cameras, projectors, microphones, and speakers. As a result, in one embodiment of said cap 454, said cap 454 includes a viewport 464. In one embodiment, said viewport 464 supports the use of said plurality of features of said display means 452. Said cap 454 provides an overhanging lip 466, where said overhanging lip 466 is used to separate said cap 454 from said case 458. In one embodiment of said case 458, said case 458 includes a viewpoint 468, and a cap-stop 470. Said cap-stop 470 limits how far into said case 458 said cap 454 is allowed. In one embodiment, said neural pince-nez nosewear can be made of one or a plurality of materials that are lightweight, with a high strength-to-weight ratio, such as structural foam, graphene, or appropriate plastics. In another embodiment, said neural pince-nez nosewear can be made of one or a plurality of materials that are transparent, such as graphene, or appropriate plastics. In another embodiment, said cap 454, case 458, and optics means 456, can each be electrical conductors, capable of supplying power to said display means 452. In still another embodiment, said cap 454, and case 458, can each be electrical conductors, capable of supplying power to said display means 452, and to said optics means 456, when said optics means 456 is said electrochromic lens. Said telescoping arm 442 has a non-circular cross-section 472, illustrated in FIG. 7, to reduce the possibility of rotation around the central axis that runs along the length of said telescoping arm 442. In one embodiment, said non-circular cross-section is elliptical. In another embodiment, said non-circular cross-section is triangular. In yet another embodiment, said non-circular cross-section is rectangular.

Finally, the present disclosure discloses a method for a new use for pince-nez mountings, comprising: using pince-nez mountings for attaching one or more said display means to said nose. An example of said new use for pince-nez mountings, covered by the present disclosure, is replacing the lens in the pince-nez mounting of U.S. Pat. No. 7,452,070 B2 with said press-on display of the present disclosure.

The invention claimed is:

1. A Neural Nosewear device, comprising:
    a. a neural communicator means comprising:
        a neural sensor, a neural stimulator, a neural communicator battery, a wireless communications transceiver, and an antenna linked together;
    b. a pince-nez mounting means comprising:
        a pince-nez spring clip for mounting onto a bridge of a nose; and
        a bendable positioning arm extending from a top side of said spring clip and connected to said neural communicator means to hold said neural communicator means in place; and
    c. at least one mounting attachment means located on said spring clip configured for mounting a display means or for holding a lens, whereby said wireless communications transceiver uses said antenna to enable wireless communication of a brainwave emissions between said neural communicator means and computing devices.

2. The device of claim 1, wherein said neural communicator means includes a wireless power receiver, or a wireless power transmitter, or a wireless power transceiver.

3. The device of claim 1, wherein said pince-nez mounting means includes a comfort means, where said comfort means can include any combination of a plurality of possible materials, shapes, and hinges, that can enhance comfort for wearer, and where said plurality of possible materials includes an adhesive means.

4. The device of claim 1, wherein said pince-nez mounting means supports attaching at least one battery.

5. The device of claim 1, wherein said display means is contained within a display means holder, and said spring clip is configured for mounting said display means holder.

6. The device of claim 1, wherein said display means is contained within a display means holder, wherein said display means holder contains an optics means, and said spring clip is configured for mounting said display means holder.

7. The device of claim 1, wherein said display means is contained within a display means holder, wherein an electrochromic lens is located inside said display means holder, in front of said display means, or an electrochromic screen is located inside said display means holder, in back of said display means, and said spring clip is configured for mounting said display means holder.

8. The device of claim 1, wherein said pince-nez spring clip includes a comfort means, where said comfort means can include any combination of a plurality of possible materials, shapes, and hinges, that can enhance comfort for wearer, and where said plurality of possible materials includes an adhesive means.

9. The device of claim 1, wherein said lens is a prescription lens, or a non-prescription lens, or a magnifying lens.

10. The device of claim 1, wherein said lens is a battery.

11. The device of claim 1, wherein said spring clip is a battery.

12. The device of claim 1, wherein said pince-nez mounting means is a battery.

13. The device of claim 1, wherein said mounting attachment means is a battery.

14. The device of claim 1, wherein said neural communicator means includes a display means.

15. The device of claim 1, further including a display means, where said display means is connected to said bendable positioning arm to hold said display means in place.

16. The device of claim 1, further including a display means, where said display means is connected to said bendable positioning arm to hold said display means in place, wherein said display means includes a projector.

17. The device of claim 1, further including a display means, where said display means is connected to said bendable positioning arm to hold said display means in place, wherein said display means includes an antenna and wireless radios, where said antenna and wireless radios are used to transmit audio and video data wirelessly to said display means mounted via said mounting attachment means, where said display means mounted via said mounting attachment means functions as a video receiver.

18. The device of claim 1, further including a display means, where said display means is connected to said bendable positioning arm to hold said display means in place, wherein said display means can include a processor, a memory, a storage, a projector, a wireless radio, an antenna, a GPS, a digital compass, a biometrics sensor, a microdisplay, a battery, a speaker, a microphone, a camera, a wireless power receiver, a wireless power transmitter, a neural interface, a gesture-base user interface, a power harvesting functionality, a head-tracking functionality, an eye-tracking functionality, a blink detection functionality, a voice recognition functionality, a speech recognition functionality, a panoramic viewing functionality of a plurality of virtual display screens, and a simultaneous viewing functionality of a plurality of virtual display screens.

19. The device of claim 1, wherein said neural communicator means, or said pince-nez mounting means, or said mounting attachment means, or said display means includes transparent materials.

20. The device of claim 1, wherein at least one mounting attachment means located on said spring clip is configured for mounting a battery, or a camera.

* * * * *